(12) United States Patent
Kim et al.

(10) Patent No.: US 8,464,686 B2
(45) Date of Patent: Jun. 18, 2013

(54) DIESEL ENGINE

(75) Inventors: Sangkyu Kim, Hiroshima (JP); Daisuke Shimo, Hiroshima (JP); Motoshi Kataoka, Hiroshima (JP)

(73) Assignee: Mazda Motor Corporation (JP)

( * ) Notice: Subject to any disclaimer, the term of this patent is extended or adjusted under 35 U.S.C. 154(b) by 855 days.

(21) Appl. No.: 12/619,530

(22) Filed: Nov. 16, 2009

(65) Prior Publication Data

US 2010/0122686 A1   May 20, 2010

(30) Foreign Application Priority Data

Nov. 18, 2008   (JP) .................. 2008-294114

(51) Int. Cl.
- *F02B 31/00* (2006.01)
- *F02B 23/06* (2006.01)
- *F02F 3/00* (2006.01)

(52) U.S. Cl.
USPC ............ 123/279; 123/298; 123/307; 123/659

(58) Field of Classification Search
USPC .......................... 123/279, 298, 285, 307, 659
See application file for complete search history.

(56) References Cited

U.S. PATENT DOCUMENTS

| | | | | |
|---|---|---|---|---|
| 4,953,528 A * | 9/1990 | Oikawa et al. | ................ | 123/276 |
| 5,099,809 A * | 3/1992 | Kawatani et al. | ............ | 123/276 |
| 6,513,476 B1 * | 2/2003 | Liu et al. | .................... | 123/193.6 |
| 6,637,402 B2 * | 10/2003 | Liu | ................ | 123/279 |
| 6,935,301 B2 * | 8/2005 | Liu | ................ | 123/294 |
| 6,997,158 B1 * | 2/2006 | Liu | ................ | 123/279 |
| 7,389,764 B1 | 6/2008 | Wickman et al. | | |
| 2003/0015167 A1 | 1/2003 | Liu et al. | | |
| 2003/0024498 A1 * | 2/2003 | Liu | ................ | 123/279 |
| 2003/0136372 A1 * | 7/2003 | Liu et al. | ................ | 123/279 |

FOREIGN PATENT DOCUMENTS

| | | |
|---|---|---|
| EP | 0 810 365 A1 | 12/1997 |
| EP | 1 264 973 A2 | 12/2002 |
| EP | 1 561 924 A2 | 8/2005 |
| EP | 2 063 081 A1 | 5/2009 |
| JP | 11036868 A | 2/1999 |
| JP | 2003-254066 A | 9/2003 |
| WO | 03/010423 A1 | 2/2003 |

OTHER PUBLICATIONS

Extended European Search Report dated Feb. 11, 2010; Application No. 09014367.8-2311.

* cited by examiner

*Primary Examiner* — Stephen K Cronin
*Assistant Examiner* — Arnold Castro
(74) *Attorney, Agent, or Firm* — Studebaker & Brackett PC

(57) ABSTRACT

A wall shape of a cavity consists of an inward protruding portion located at the periphery of an opening, a center portion projecting toward a fuel injector, and a peripheral portion connecting the inward protruding portion and the center portion. The fuel injector and the cavity are configured so that fuel injected from fuel injector directs to the proximity of the border between the inward protruding portion and the peripheral portion. The peripheral portion consists of a first portion located farthermost from the fuel injector, a second portion located between the inward protruding portion and the first portion, and a third portion located between the first portion and the center portion. The radii of arcs of the peripheral portion decrease from the second portion to the first portion and increase from the first portion to the third portion.

5 Claims, 8 Drawing Sheets

Comparative Example      Present Embodiment

DIESEL ENGINE

BACKGROUND OF THE INVENTION

The present invention relates to a diesel engine, and in particular, relates to a combustion chamber structure of the diesel engine which can restrain the soot emission.

In the direct-injection type of diesel engine, in which fuel is injected from the fuel injector which is arranged approximately at the center of the combustion chamber at around the top dead center of compression of the piston, the cavity is formed on the top of the piston and the combustion chamber is defined by the top of the piston including the cavity, the cylinder, and the face of the cylinder head which faces the top of the piston, which is disclosed in Japanese Patent Laid-Open Publication No. 2003-254066, for example.

The above-described cavity is formed in a circular shape with its center at the fuel injector and is concaved away from the cylinder head. Its wall shape on the cross section including the center axis of the cylinder consists of, as shown in FIG. 12, for example, an inward protruding portion 2 which is located at the periphery of the opening of the top of the piston for a cavity 1, a center portion 3 which projects toward a fuel injector 5 and is located at the bottom of the cavity 1, and a peripheral portion 4 which connects the inward protruding portion 2 and the center portion 3 and is made with arcs having their centers on the inner side of the cavity.

Herein, the fuel injected from the fuel injector 5 at around the top dead center of compression of the piston directs to the proximity of the border between the inward protruding portion 2 and the peripheral portion 4 of the cavity 1. After colliding with the wall surface of the cavity 1, the fuel spreads along the wall surface of the peripheral portion 4 and toward the center portion 3. Thus, the fuel mixes with the air in the combustion chamber and starts its combustion.

If the mixing of the fuel spray from the fuel injector and the air in the cavity was so insufficient that the air-fuel ratio of the mixture did not become properly uniform (homogeneous), the soot would be generated at an over-rich area inside the combustion chamber, so that the soot would be exhausted to the outside without sufficiently oxidizing (purifying).

It is preferable that the fuel spray be mixed with the air so well in the cavity that the whole part of mixture can become properly uniform (homogeneous) in the lean state of air-fuel ratio in order to restrain the generation of the soot or promote the oxidization of the generated soot. Thus, as shown in FIG. 12, it may be necessary that the flowing direction of the fuel spray A which is injected from the fuel injector 5 and directs to the proximity of the border between the inward protruding portion 2 and the peripheral portion 4 of the cavity 1 is smoothly changed, as shown by an arrow a, along the wall surface of the peripheral portion 4 toward the center portion 3. Further, it may be necessary that the fuel spray A flowing toward the center of the cavity 1, which is shown by an arrow b, is mixed with the air sufficiently.

SUMMARY OF THE INVENTION

Accordingly, an object of the present invention is to provide a diesel engine comprising a piston with a cavity at its top which can provide the sufficient mixing of fuel spray with air, thereby restraining the soot emission toward the outside.

According to the present invention, there is provided a diesel engine comprising a cylinder, a piston which reciprocates in the cylinder, a cylinder head on which an intake valve and an exhaust valve are arranged, a fuel injector which is arranged on the cylinder head and injects fuel radially approximately from a center of the cylinder, a circular cavity which is formed on a top of the piston and is concaved away from the cylinder head, and a combustion chamber which is defined by the top of the piston including the cavity, the cylinder and a face of the cylinder head that faces the top of the piston, wherein a wall shape of the cavity on a cross section including a center axis of the cylinder consists of an inward protruding portion located at the periphery of an opening of the top of the piston for the cavity, a center portion projecting toward the fuel injector and located at the bottom of the cavity, and a peripheral portion which connects the inward protruding portion and the center portion and is made with arcs having their centers on the inner side of the cavity, wherein the fuel injector and the cavity are configured so that fuel injected from the fuel injector directs to a proximity of the border between the inward protruding portion and the peripheral portion, wherein the peripheral portion consists of a first portion located farthermost from the fuel injector among the entire peripheral portion, a second portion located between the inward protruding portion and the first portion, and a third portion located between the first portion and the center portion, and wherein radii of arcs of the peripheral portion decrease from the second portion to the first portion and increase from the first portion to the third portion.

According to the present invention, after the fuel spray radially injected from the fuel injector at around the top dead center of compression of the piston collides with the wall surface at the proximity of the border between the inward protruding portion and the peripheral portion of the cavity formed on the top of the piston, its flowing direction is changed along the above-described second portion of the peripheral portion toward the bottom of the cavity.

Herein, since the arc of the second portion having its centers on the inner side of the cavity has a relatively large radius of curvature, the angle between the fuel-injection direction and the tangential line of the wall surface where the fuel spray collides can be made properly small. Thereby, the fuel spray can be prevented from spreading improperly widely when colliding with the wall surface, so that the fuel spray can be smoothly guided along the second portion of the peripheral portion.

The fuel spray then flows to the first portion and changes its flowing direction from the outside of the piston to the inside of the piston. Herein, since the radii of curvature of the arcs of the peripheral portion decrease from the second portion to the first portion, the fuel spray flowing along these portions is accelerated in speed without spreading improperly widely, so that the fuel spray moves to the third portion, substantially maintaining its power at the injection.

Further, while part of the fuel has already started its combustion at this point and therefore some amount of combustion gas is generated, since the fuel spray mixed with this combustion gas is accelerated in its speed at the first portion as described above, the fuel on the wall surface of the peripheral portion of the cavity can be blown off surely, so that the generation of soot, which may be caused by a local over-rich area generated by the fuel remaining on the wall surface, can be restrained properly.

Moreover, since the radius of curvature of the third portion is larger than that of the first portion, the flowing direction of the fuel spray or the gas in the half-combustion state which are introduced to the third portion is so prevented from changing suddenly that the fuel spray or the gas in the half-combustion state can be restrained from being off the wall surface of the cavity toward the opening of the cavity. Accordingly, any improper interference of these fuel spray or gas with the fuel spray injected from the fuel injector which has not reached the wall surface of the cavity can be avoided. As a result, the fuel spray is guided properly and flows toward the center of the bottom of the cavity without spreading improperly widely, so that the fuel spray can mix with the sufficiently large amount of air properly.

Thus, the generation of over-rich area due to the mixture being not uniform (homogeneous) in the combustion chamber and the generation of soot due to the combustion of the fuel in the over-rich area can be properly restrained. Further, since the whole part of mixture can be made properly uniform (homogeneous) in the lean state of air-fuel ratio, even if the soot may be generated at the initial stage or the middle stage of combustion, the oxidization of the soot can be promoted at the late stage of combustion, thereby restraining the soot from being exhausted to the outside.

Moreover, the above-described mixture and part of combustion gas ride on a reverse-squish flow which is generated by the piston lowering toward the bottom dead center of the piston and spread smoothly and widely in the combustion chamber expanding. As a result, the proper mixing of the fuel with the air in the whole part of combustion chamber can be achieved, and thereby the power can be generated efficiently.

According to an embodiment of the present invention, the radii of arcs of the peripheral portion continuously change from an end of the second portion on the side of the inward protruding portion through the first portion to an end of the third portion on the side of the center portion. Thereby, the fuel spray can be smoothly accelerated in its speed as it flows from the second portion to the first portion, and its flowing direction can be changed smoothly toward the center of the bottom of the cavity at the third portion. Thus, the above-described advantages of the present invention can be more effectively achieved.

According to another embodiment of the present invention, the second portion and the third portion are formed symmetric with respect to a line connecting a point in the first portion located farthermost from the fuel injector and an injection hole of the fuel injector. Thereby, the flow of the above-described gas in the half-combustion state becomes symmetric with respect to the above-described point in the first portion, so that the flowing direction from the outside to the inside of the piston can change smoothly and surely without improperly spreading.

According to another embodiment of the present invention, the inward protruding portion is formed with an arc having its center on a side opposite to the cavity on the cross section including the center axis of the cylinder. Thereby, part of the fuel spray which collides with the wall surface at the proximity of the border between the second portion of the peripheral portion and the inward protruding portion can be smoothly guided toward the second portion of the peripheral potion, without spreading improperly. As a result, most part of fuel injected can be properly introduced into the cavity.

According to another embodiment of the present invention, the first, second and third portions are formed with constant radii respectively. Thereby, manufacturing of the cavity can be facilitated compared to a case in which these radii change continuously, so that the above-described advantages of the present invention can be achieved with properly low costs.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
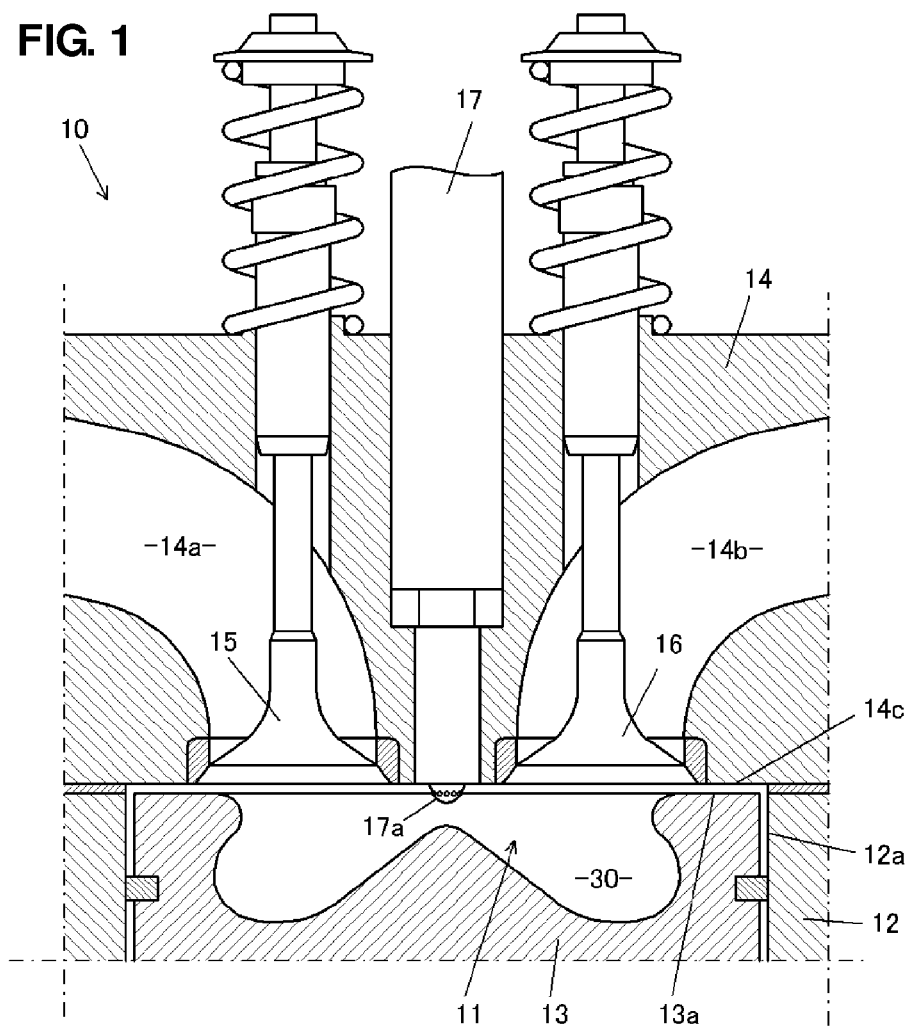
FIG. 1 is a sectional view of a combustion chamber according to a first embodiment of the present invention.

FIG. 1 shows a structure of a combustion chamber of a diesel engine according to the present embodiment. A combustion chamber 11 of an engine 10 comprises a cylinder 12a which is formed at a cylinder block 12, a top 13a of a piston 13 which reciprocates in the cylinder 12a, and a lower face 14c of a cylinder head 14 at which an intake valve 15 to open or close an intake port 14a and an exhaust valve 16 to open or close an exhaust port 14b are arranged. The lower face 14c faces the piston top 13a.

Further, a circular cavity 30 is formed on the top 13a of the piston 13 in such a manner that it is concaved away from the lower face 14c of the cylinder head 14. A space of this cavity 30 defines the above-described combustion chamber 1 as well. A fuel injector 17 is attached to the cylinder head 14 so that its tip is positioned at the center of the cavity 30 or the combustion chamber 11.

Next, a wall shape of the cavity 30 on a cross section including a center axis X-X of the cylinder will be described referring to FIG. 2. The cavity 30 consists of an inward protruding portion 32 which is located at the periphery of an opening 31 of the piston top 13a and has the diameter which is smaller than that of the inside of the cavity, a peripheral portion 33 which extends from the inward protruding portion 32 toward the bottom of the cavity 30, and a center portion 34 which extends from the inward protruding portion 32 toward the center of the cavity 30. This center portion 34 projects toward the fuel injector 17.

A plurality of injection holes 17a . . . 17a is formed at the periphery of the tip of the fuel injector 17. Herein, the injection holes 17a of the fuel injector 17 are formed so that the fuel is injected radially toward the cavity peripheral portion 33 at around the top dead center of compression of the piston 13 and a fuel spray A directs to the proximity of the border between the peripheral portion 33 and the inward protruding portion 32 of the cavity on the cross section including the center axis X-X of the cylinder, as shown in FIGS. 2 and 3.

Figure 2:
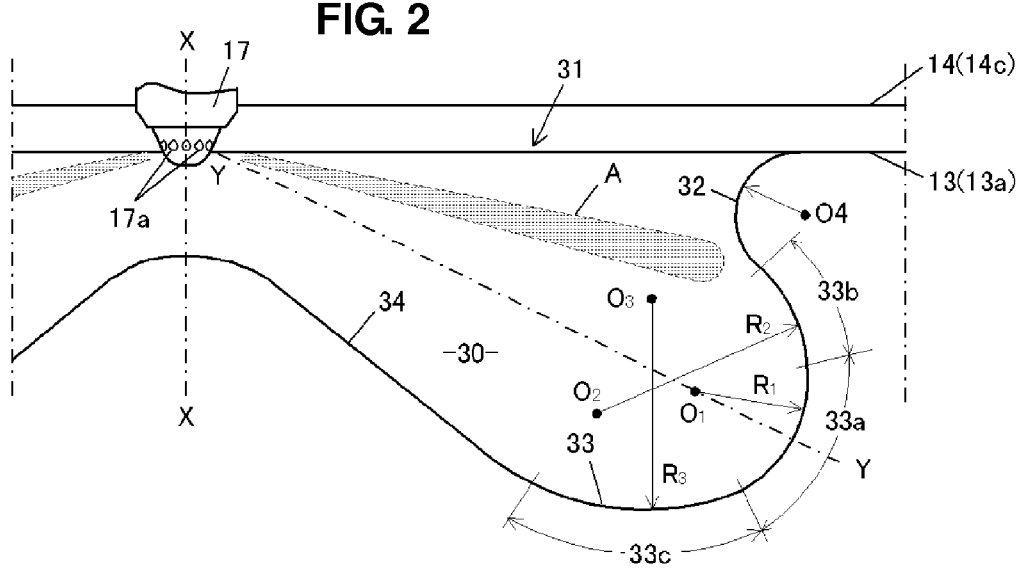
FIG. 2 is a sectional view of a cavity which defines the combustion chamber.
Figure 3:
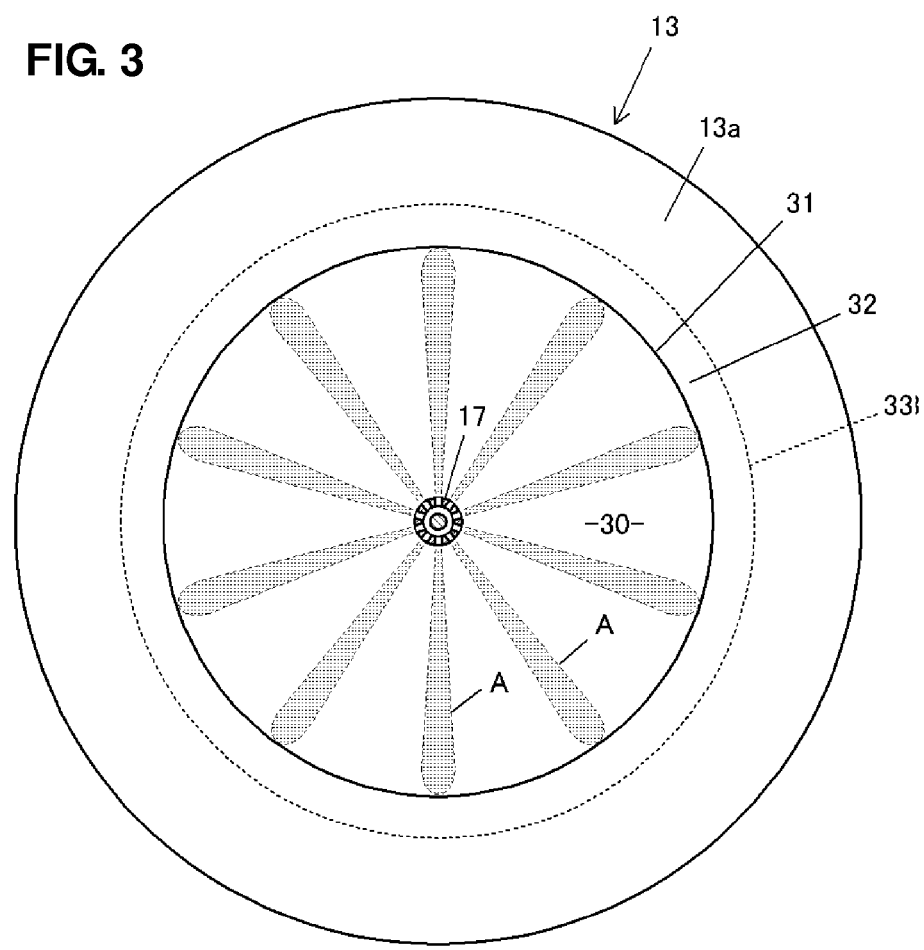
FIG. 3 is a plan view of a piston on which the cavity is formed.

Further, as shown in FIG. 2, the cavity peripheral portion 33 consists of a first portion 33a which is located farthermost from the fuel injector 17 among the entire peripheral portion, a second portion 33b which is located on the side of the inward protruding portion 32 relative to the first portion 33a, and a third portion 33c which is located on the side of the center portion 34 relative to the first portion 33a. These portions 33a, 33b, 33c are made with arcs having their centers $O_1$, $O_2$, $O_3$ on the inner side of the cavity 30.

Herein, the radius $R_2$ of the arc of the second portion 33b is set to be equal to the radius $R_3$ of the arc of the third portion 33c, and the radius $R_1$ of the first portion 33a is set to be smaller than the radius $R_2$, $R_3$. Accordingly, the wall shape of the cavity peripheral portion 33 having the above-described portions 33a, 33b, 33c is configured so that the second portion 33b and the third portion 33c are formed symmetric with respect to a line Y-Y which connects the center of the first portion 33a which is located farthermost from the injection hole 17a and the injection hole 17a of the fuel injector 17.

The inward protruding portion 32 is formed with the arc having its center $O_4$ on a side opposite to the cavity on the cross section including the cylinder center axis X-X.

Hereinafter, the operation of the present embodiment will be described.

Figure 4:
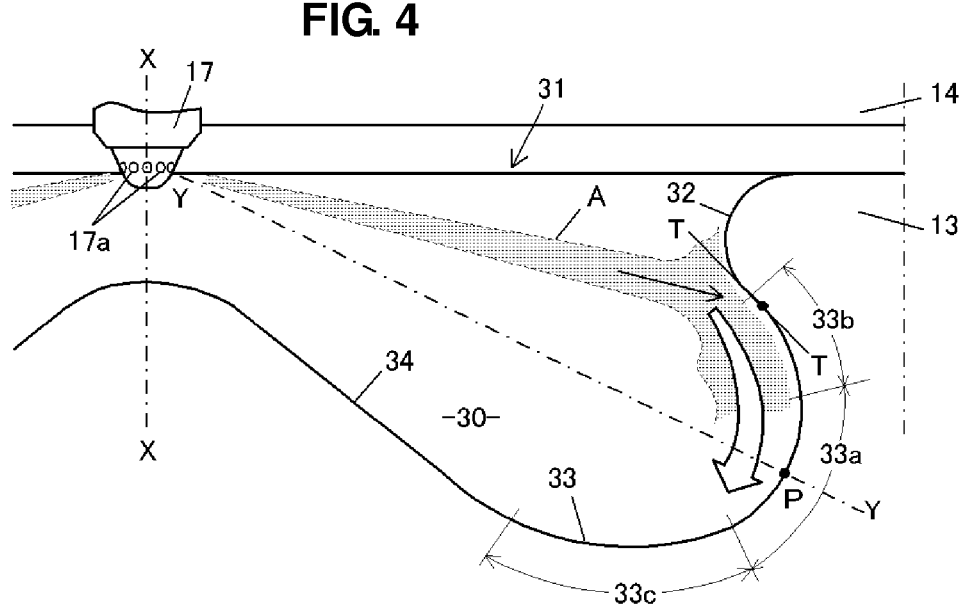
FIG. 4 is an explanatory diagram showing a combustion state at an initial stage of combustion.

At first, the state of the initial combustion stage, which is before the timing the direction of the fuel spray A radially injected from the fuel injector 17 at around the top dead center of compression of the piston is changed from the outside of the piston to the inside of the piston at the peripheral portion 33 of the cavity 30 formed on the piton top 13a as shown in FIG. 4, will be described.

The fuel spray A collides with the wall surface of the proximity of the border between the inward protruding portion 32 and the peripheral portion 33 of the cavity 30, and then is changed in its direction along the second portion 33b of the cavity peripheral portion 33 toward the bottom of the cavity 30.

Herein, since the arc of the second portion 33b having its centers $O_2$ on the inner side of the cavity has the relatively large radius $R_2$ of curvature, the angle between the fuel-injection direction and the tangential line T-T of the wall surface where the fuel spray A collides can be made properly small. Thereby, the fuel spray A can be prevented from spreading improperly widely when colliding with the wall surface, so that the fuel spray A can be smoothly guided along the second portion 33b of the peripheral portion.

Further, since the inward protruding portion 32 is formed with the arc having its center $O_4$ on the side opposite to the cavity on the cross section including the center axis X-X of the cylinder, part of the fuel spray which collides with the wall surface of the proximity of the border between the second portion 33b of the peripheral portion 33 and the inward protruding portion 32 can be smoothly guided toward the second portion 33b of the peripheral potion 33, without spreading improperly.

The fuel spray A then flows from the second portion 33b to the first portion 33a, and changes its flowing direction from the outside to the inside of the piston 3. Herein, since the arc radius $R_1$ of the first portion 33a is smaller than the arc radius $R_2$ of the second portion 33b, the fuel spray A flowing along these portions is accelerated in speed without spreading improperly widely, so that the fuel spray A moves to the third portion 33c, substantially maintaining its power at the injection.

While part of the fuel has started its combustion at this point and therefore some combustion gas is generated, since the fuel spray A mixed with this combustion gas is accelerated at the first portion 33a, the fuel on the wall surface of the cavity peripheral portion 33 can be blown off, so that the generation of soot, which may be caused by a local over-rich area generated by the fuel remaining on the wall surface, can be restrained properly.

Further, since the second portion 33b and the third portion 33c are formed symmetric with respect to the line Y-Y connecting the point P in the first portion 33a which is located farthermost from the fuel injector 17 and the injection hole 17a of the fuel injector 17, the flow of the above-described gas in the half-combustion state becomes symmetric with respect to the above-described point P in the first portion. Consequently, the direction of the flowing from the outside to the inside of the piston 13 can change smoothly and surely without improperly spreading.

Figure 5:
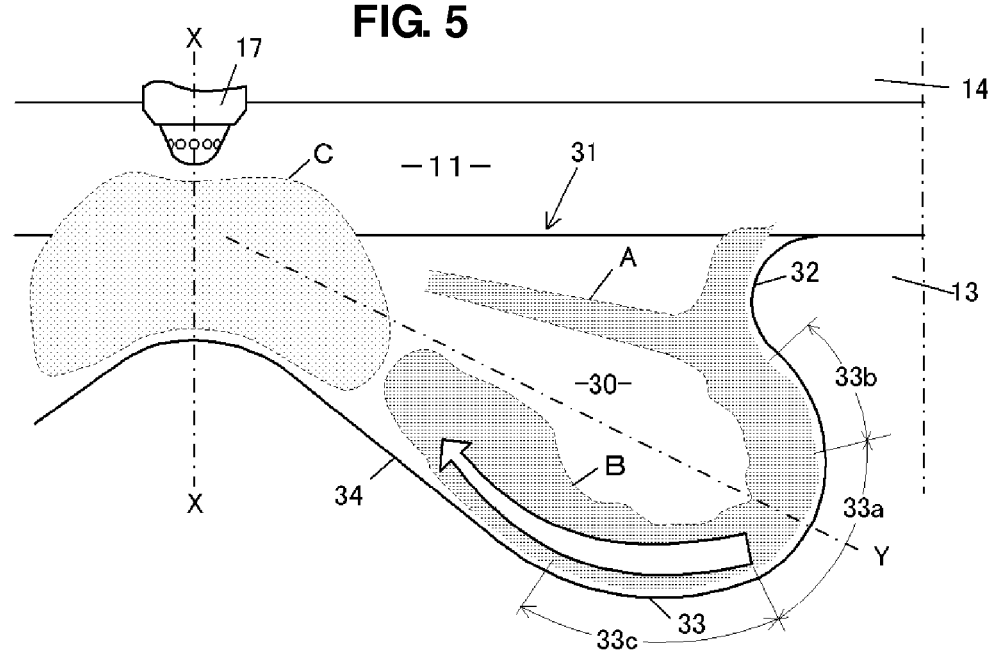
FIG. 5 is an explanatory diagram showing a combustion state at a middle stage of combustion.

Next, the middle combustion stage, which is before the timing the half-combustion gas which has been changed in its flowing direction toward the inside of the piston 13 mixes with the air in the cavity center portion 34, will be described. As shown in FIG. 5, the flow of the half-combustion gas B is guided by the third portion 33c of the cavity peripheral portion 33 toward the center portion 34 which projects at the cavity bottom.

Herein, since the arc radius $R_3$ of the third portion 33c is larger than the arc radius $R_1$ of the first portion 33a, the flowing direction of the fuel spray introduced to the third portion 33c is so prevented from changing suddenly that any improper interference of the fuel spray with the new fuel spray A injected from the fuel injector which has not reached the wall surface of the cavity can be avoided.

As a result, the half-combustion gas B flows toward the center portion 34 of the cavity 30, substantially maintaining the power at the injection without spreading improperly, and mixes properly with a large amount of air of the center portion of the combustion chamber 11, thereby producing the proper uniform (homogeneous) and lean mixture. Thus, the generation of soot due to the combustion of the fuel in the over-rich area can be restrained. Further, since the whole part of mixture can be made properly uniform (homogeneous) in the lean state of air-fuel ratio, even if the soot may be generated, the oxidization of the soot can be promoted.

Figure 6:
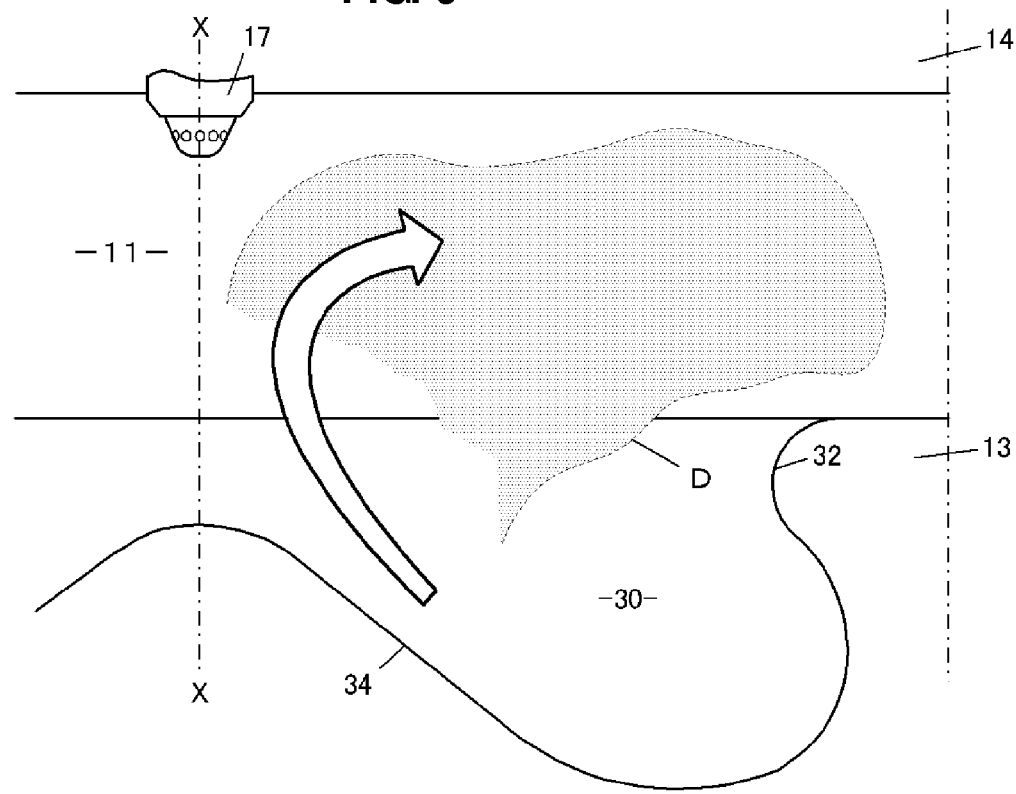
FIG. 6 is an explanatory diagram showing a combustion state at a late stage of combustion.

The late combustion stage where the combustion gas which has been produced as described above starts driving the piston 13 will be described. As shown in FIG. 6, when the volume of the combustion chamber 11 increases as the piston lowers, a reverse-squish flow is produced. This reverse-squish flow is a flow of gas which moves from the inside of the cavity 30 into a peripheral space of the combustion chamber 11 between the piston top 13a and the lower face 14c of the cylinder head.

Meanwhile, there exists a combustion gas D generated described above at the center portion of the combustion chamber 11. The combustion gas D may ride on the above-described reverse-squish flow and spread smoothly and widely in the combustion chamber 11 expanding. As a result, the air in the whole part of combustion chamber 11 can be efficiently used for the combustion, and thereby the high efficient combustion can be obtained. Thus, the appropriate combustion of the fuel can be promoted and the properly large drive force can be applied to the piston 13.

Then, the gas which has been combusted in the combustion chamber 11 is exhausted to the outside in the engine's exhaust cycle. Herein, since the generation of the soot can be properly restrained and also the oxidization of even the soot produced can be properly promoted as described above, the soot emission to the outside can be effectively prevented.

Embodiment 2

Next, a second embodiment of the present invention will be described.

Figure 7:
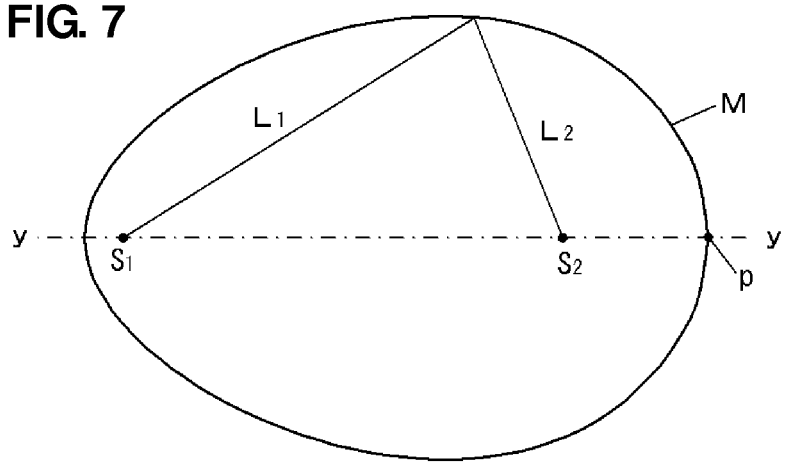
FIG. 7 is an explanatory diagram of an oval curve which is used in a second embodiment.

The present embodiment uses the so-called Cartesian oval curve as the wall shape of the cavity peripheral portion. This oval curve M is shown as gathering of points defined by L1+mL2=a (L1, L2 are respectively distances L1, L2 from its focal points $S_1$, $S_2$; m and a are a constant, respectively) as shown in FIG. 7. Its radius is the shortest at an intersection p of a center line y-y which connects the focal points $S_1$, $S_2$ and the curve M, and its radius gradually increases toward the both sides from the intersection p.

Figure 8:
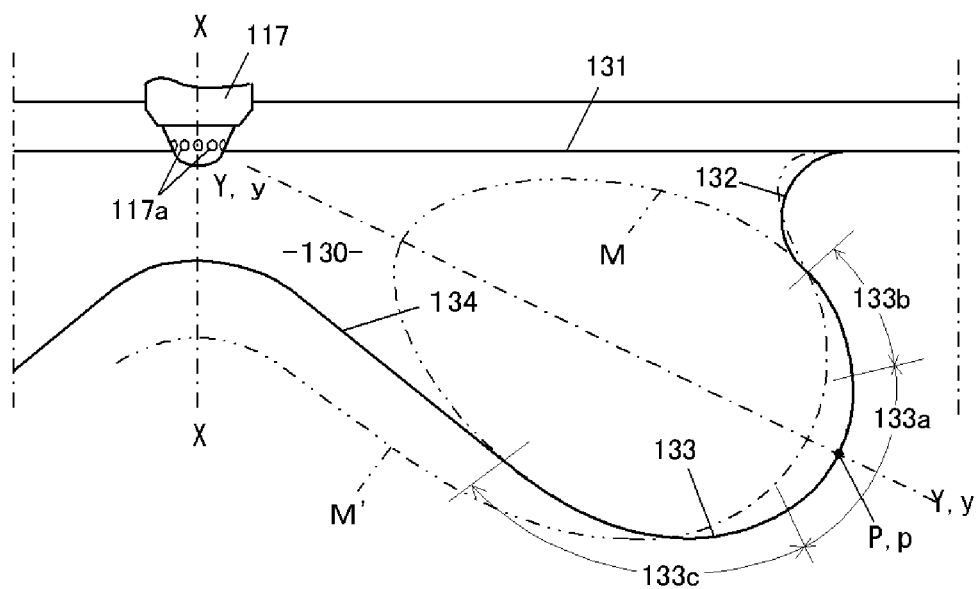
FIG. 8 is a sectional view of a cavity which uses the above-described curve.

Herein, as shown in FIG. 8, the above-described center line y-y of the oval curve is matched to the line Y-Y connecting a point P of a peripheral portion 133 of a cavity 130 which is located farthermost from an injection hole 177*a* of a fuel injector 177 and the injection hole 177*a*, and the intersection p of the oval curve M and the center line y-y is positioned at the above-described point P. Further, the arc of an inward protruding portion 132 at the periphery of a cavity opening 131, which has its center on the side opposite to the cavity 130, and the curve forming a cavity center portion 134 which projecting toward the fuel injector 117 are formed to be continuous from part of the above-described oval curve M including the intersection p.

Like the above-described first embodiment, the peripheral portion 133 consists of a first portion 133*a* which has its center at the above-described intersection p, a second portion 133*b* which is located on the side of the inward protruding portion 132, and a third portion located 133*c* which is located on the side of the center portion. Herein, the radii of arcs of the peripheral portion 133 decrease from the second portion 133*b* to the first portion 133*a* and increase from the first portion 133*a* to the third portion 133*c*.

Herein, a computer analysis model for the above-described cavity 130 of the present embodiment was created, and then analyses on a distribution of gas flowing-speed, a distribution of the equivalent ratio of fuel and air, and characteristics of temperature-equivalent ratio of the gas in the cavity 130 after the fuel injection were conducted by using various parameters relating to the fuel injected from the fuel injector 117 and the air in the cavity 130 and specified equations. Further, an analysis for another model of the cavity with a curve M' of the peripheral portion having a constant radius, which is illustrated by a two-dotted line in FIG. 8, was conducted as a comparative example.

Figure 9A:
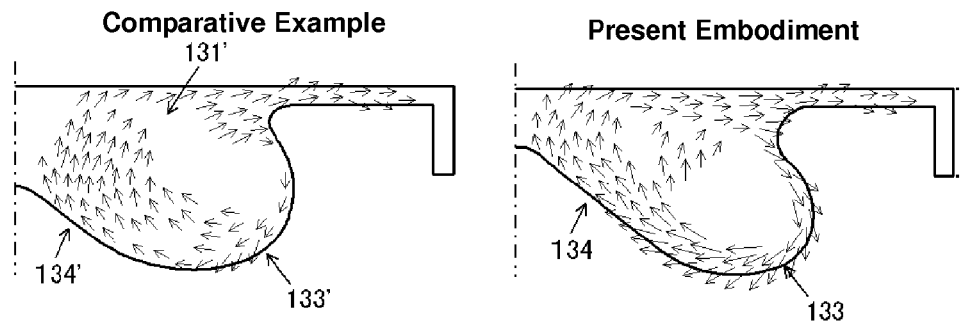
FIGS. 9A-9C are a gas's flowing-speed distribution diagram, an equivalent ratio distribution diagram, and a temperature-equivalent ratio characteristics diagram, which show results of analyses of the cavity shown in FIG. 8 at the initial stage of combustion, along with a comparative example.

The result of the analysis on the distribution of gas flowing-speed at the initial stage of combustion is shown in FIG. 9A. Regarding the comparative example, the gas flow exfoliated from the cavity wall surface halfway from a peripheral portion 133' to a center portion 134', and then spread and directed toward a cavity opening 131'. Meanwhile, regarding the model of the present embodiment, the smooth gas flow along the cavity wall from the peripheral portion 133 to the center portion 134 occurred.

Figure 9B:
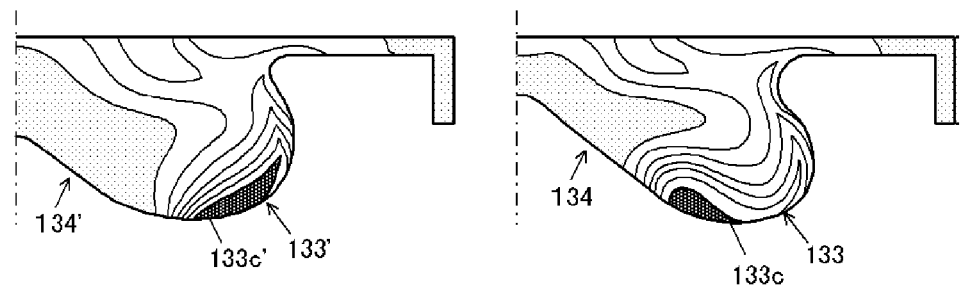

Further, the result of the analysis on the distribution of the equivalent ratio at the initial stage of combustion is shown in FIG. 9B. Regarding the comparative example, an area having a large equivalent ratio (rich area) remained around a third portion 133*c*' of the peripheral portion 133'. Meanwhile, regarding the model of the present embodiment, that distribution showed a moving state along the cavity wall from the third portion 133*c* of the peripheral portion 133 to the center portion 134. Thus, it was found that the mixing of the fuel spray and the air according to the present embodiment were properly prompted compared with the case according to the comparative example. In this figure, the darkest illustration area shows the area with the maximum equivalent ratio, and lighter illustration areas show areas with smaller equivalent ratios.

Figure 9C:
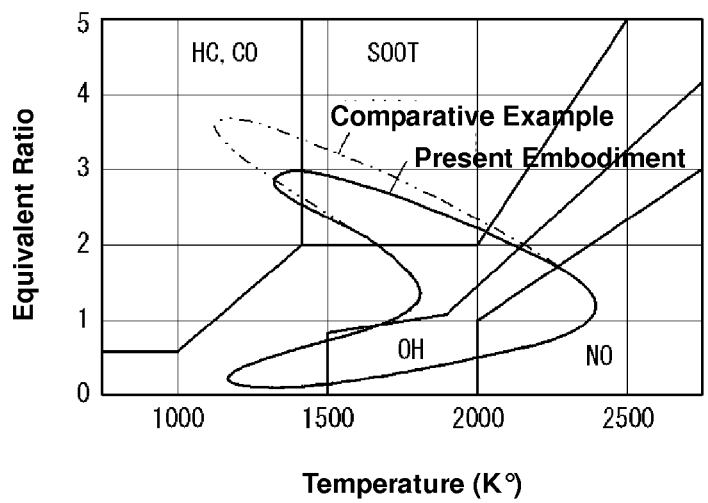

Moreover, the result of the analysis on the characteristics of temperature-equivalent ratio of the gas at the initial stage of combustion is shown in FIG. 9C. Regarding the comparative example shown by a two-dotted broken line, part of the distributed gas belonged to the HC, CO generation area (incomplete combustion area), and the rest of considerably large part of the distributed gas belonged to SOOT area (soot generation area). Meanwhile, regarding the model of the present embodiment, the gas part belonging to the HC, CO generation area was extremely small, and the part belonging to the SOOT area was relatively small compared with the case according to the comparative example. That is, it was found that the generation of HC, CO and soot properly reduced compared with the comparative example.

Figure 10A:
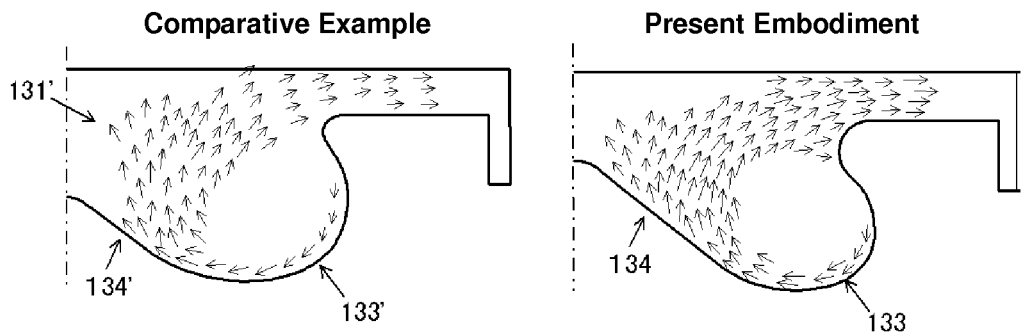
FIGS. 10A-10C are, likewise, a gas's flowing-speed distribution diagram, an equivalent ratio distribution diagram, and a temperature-equivalent ratio characteristics diagram, which show results of analyses of the cavity at the middle stage of combustion, along with the comparative example.
Figure 10B:
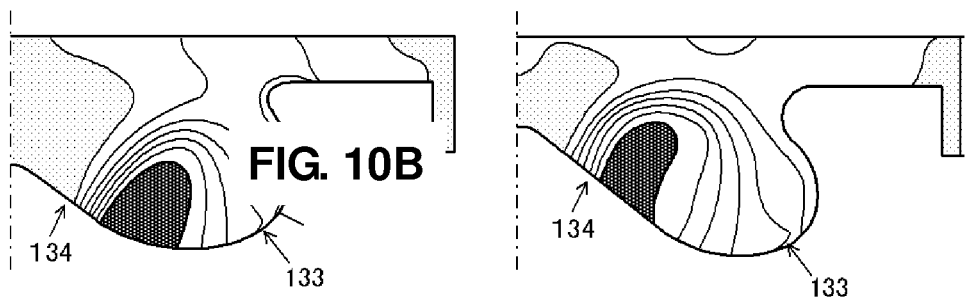
Figure 10C:
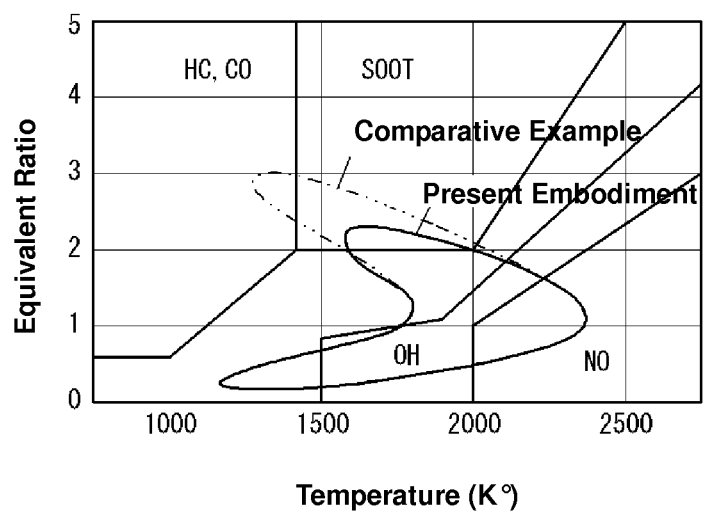

Meanwhile, the results of the analysis at the middle stage of combustion are shown in FIGS. 10A, 10B and 10C. Regarding the comparative example, as shown in FIG. 10A, the gas flow almost fully exfoliated from the cavity wall surface at around the boarder between the peripheral portion 133' and the center portion 134', and then directed toward the cavity opening 131' from the cavity bottom portion, so that the flowing power toward the cavity center portion 134' weakened. Meanwhile, regarding the model of the present embodiment, the gas accelerated along the wall surface at the peripheral portion 133 reached the center of the center portion 134. That is, it was found that the improper spreading of the gas flow was restrained and the power of the gas flowing was properly maintained compared with the comparative example.

Further, the result of the analysis on the distribution of the equivalent ratio at the middle stage of combustion is shown in FIG. 10B, which was influenced by the result of the gas flow distribution at the initial stage of combustion. Regarding the comparative example, since the gas flow exfoliated from the cavity wall surface and spread at the initial stage of combustion, the rich area of the equivalent ratio remained at around the border between the cavity peripheral portion 133' and the center portion 134'. Meanwhile, regarding the model of the present embodiment, since the gas flow did not spread very much and thus was a rather smooth flow along the wall surface from the peripheral portion 133 to the center portion 134 at the initial stage of combustion, the rich area was brought up to the cavity center portion 134. Further, the leanest area was smaller than that of the model of the comparative example. Thus, the mixing of fuel and air of the present embodiment was promoted.

Moreover, depending on these results, the result of the analysis on the characteristics of temperature-equivalent ratio of the gas at the middle stage of combustion is shown in FIG. 10C. Regarding the comparative example, likewise, part of the gas belonged to the HC, CO generation area, and the rest of considerably large part of the distributed gas belonged to SOOT area. Meanwhile, regarding the model of the present embodiment, there exits no area belonging to the HC, CO generation area, and the part belonging to the SOOT area was extremely small. That is, it was found that the generation of soot properly reduced compared with the comparative example.

Figure 11A:
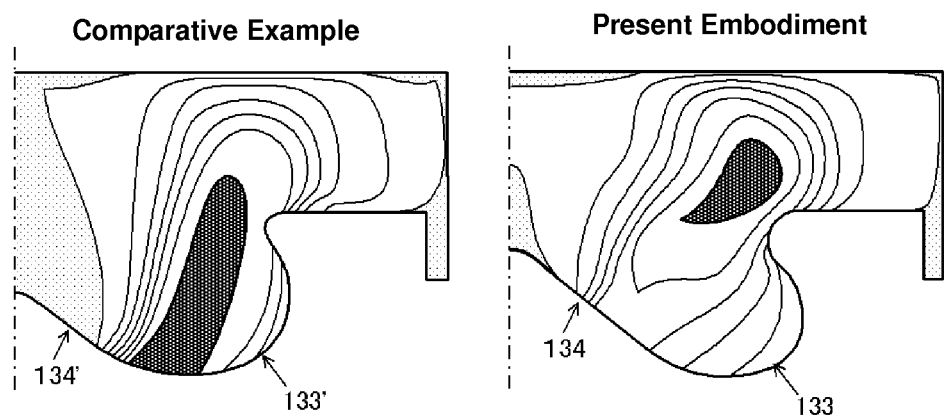
FIGS. 11A and 11B are, likewise, an equivalent ratio distribution diagram and a temperature-equivalent ratio characteristics diagram, which show results of analyses of the cavity at the late stage of combustion, along with the comparative example.
Figure 11B:
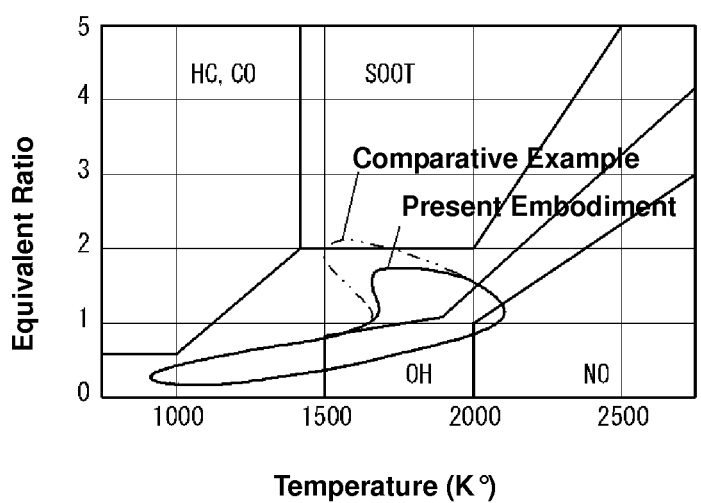
Figure 12:
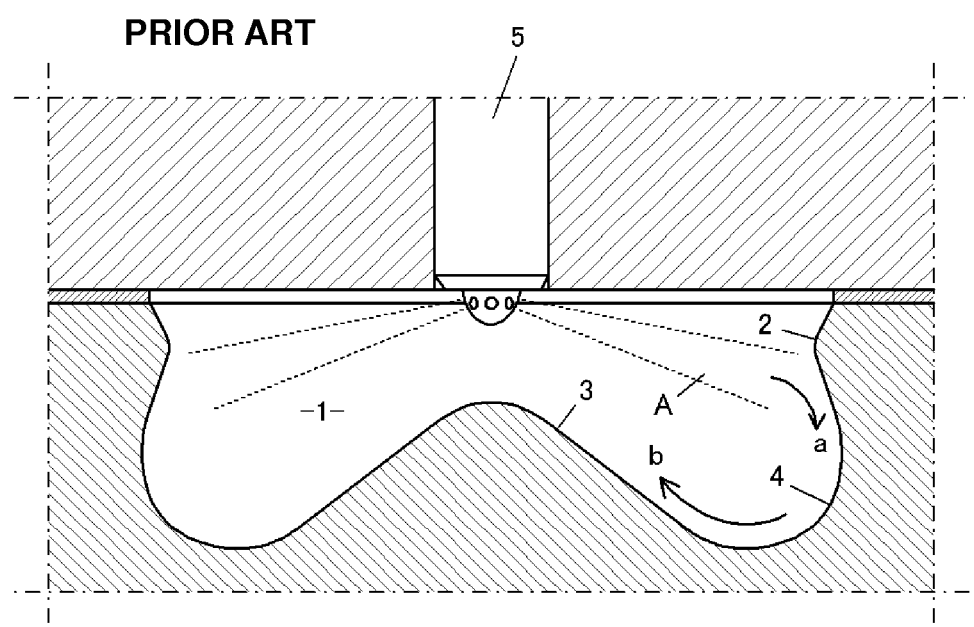
FIG. 12 is a sectional view showing a structure of a conventional combustion chamber.

The results of analyses of the distribution of the equivalent ratio and the characteristics of temperature-equivalent ratio at the late stage of combustion are shown in FIGS. 11A and 11B. In the distribution of the equivalent ratio, regarding the comparative example, the gas flow almost fully exfoliated from the cavity wall surface at around the boarder between the peripheral portion 133' and the center portion 134', and thus the power of the flow directing toward the cavity center portion 134' weakened. Accordingly, the richest area of the equivalent ratio remained at around the border between the peripheral portion 133' and the center portion 134'. Meanwhile, the leanest area of the equivalent ratio remained largely at the central portion of the combustion chamber. Thus, the mixing of fuel and air was insufficient.

However, regarding the model of the present embodiment, since the gas flow properly rode on the powerful flow from the peripheral portion 133 to the center portion 134 which was held until the middle stage of combustion, the richest area and the leanest area of the equivalent ratio became small, so that the mixing of the fuel spray or the combustion gas and the air was properly promoted. Moreover, the combustion gas rode on the reverse-squish flow and thereby spread properly around the peripheral portion of the combustion chamber.

Thus, as shown by the results of the characteristics of temperature-equivalent ratio of FIG. 11B, the model of the present embodiment showed a properly large lean and uniform (homogeneous) distribution as a whole, compared with the model of the comparative example. In particular, the area belonging to the OH area (oxidization area of soot) was larger, so that the soot which had been generated at the initial or middle stages of combustion was effectively oxidized at the late stage of combustion.

The present invention should not be limited to the above-described embodiments, and any other modifications and improvements may be applied within the scope of a sprit of the present invention.

What is claimed is:

1. A diesel engine comprising:
   a cylinder;
   a piston which reciprocates in said cylinder;
   a cylinder head on which an intake valve and an exhaust valve are arranged;
   a fuel injector which is arranged on said cylinder head and injects fuel radially approximately from a center of said cylinder;
   a circular cavity which is formed on a top of said piston and is concaved away from said cylinder head; and
   a combustion chamber which is defined by said top of said piston including said cavity, said cylinder, and a face of said cylinder head that faces said top of said piston,
   wherein a wall shape of said cavity on a cross section including a center axis of said cylinder consists of an inward protruding portion located at the periphery of an opening of said top of said piston for said cavity, a center portion projecting toward said fuel injector and located at the bottom of said cavity, and a peripheral portion which connects said inward protruding portion and said center portion and is made with arcs having their centers on the inner side of said cavity,
   wherein said fuel injector and said cavity are configured so that fuel injected from said fuel injector directs to a proximity of the border between said inward protruding portion and said peripheral portion,
   wherein said peripheral portion consists of a first portion located farthermost from said fuel injector among the entire peripheral portion, a second portion located between said inward protruding portion and said first portion, and a third portion located between said first portion and said center portion,
   wherein radii of arcs of said peripheral portion decrease from said second portion to said first portion and increase from said first portion to said third portion, and
   wherein said second portion and said third portion are formed symmetric with respect to a line connecting a point in said first portion located farthermost from said fuel injector and an injection hole of said fuel injector such that the radii of the arcs of the second portion and the third portion are equal and the centers of the arcs of the second portion and the third portion are located at symmetric positions with respect to said line.

2. The diesel engine as described in claim 1, wherein said radii of arcs of said peripheral portion continuously change from an end of said second portion on the side of said inward protruding portion through said first portion to an end of said third portion on the side of said center portion.

3. The diesel engine as described in claim 1, wherein said first, second and third portions are formed with constant radii respectively.

4. The diesel engine as described in claim 1, wherein said inward protruding portion is formed with an arc having its center on a side opposite to said cavity on said cross section including said center axis of said cylinder.

5. The diesel engine as described in claim 1, wherein the wall shape of said peripheral portion of the cavity is made of a Cartesian oval curve which has a symmetric shape with a center line thereof.

* * * * *